March 25, 1924.
G. M. KENDALL
FENDER BRACE
Filed Sept. 7, 1922
1,487,782
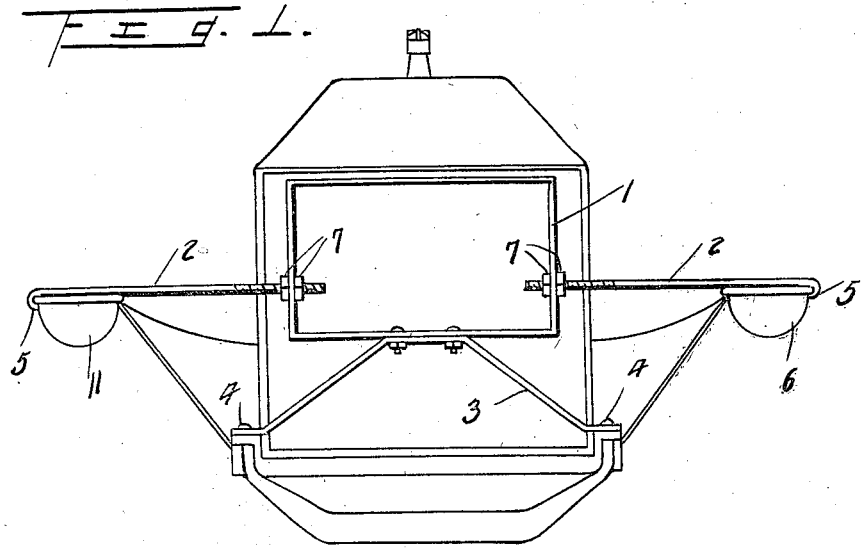
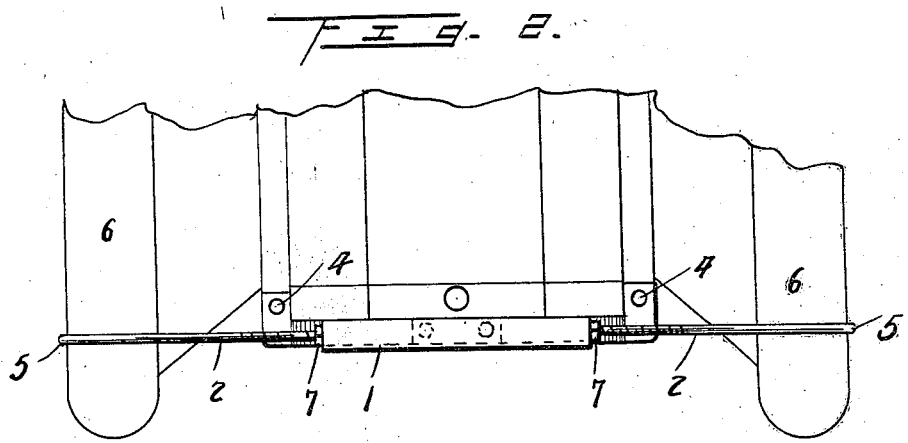
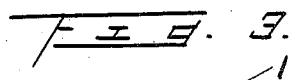
Inventor
G. M. Kendall.

Patented Mar. 25, 1924.

1,487,782

UNITED STATES PATENT OFFICE.

GEORGE M. KENDALL, OF WEATHERFORD, TEXAS, ASSIGNOR OF ONE-HALF TO CHARLES A. FLEMING, OF WEATHERFORD, TEXAS.

FENDER BRACE.

Application filed September 7, 1922. Serial No. 586,713.

*To all whom it may concern:*

Be it known that I, GEORGE M. KENDALL, a citizen of the United States, residing at Weatherford, in the county of Parker and State of Texas, have invented certain new and useful Improvements in Fender Braces; and I do hereby declare the following to be a full, clear, and exact description of the invention, such as will enable others skilled in the art to which it appertains to make and use the same.

The invention relates to a brace for the wheel fenders of automobiles and motor vehicles and provides a brace in the nature of an attachment which may be readily placed in position so as to support and prevent sag of the fenders, and which furthermore may be utilized as supporting means for the number plate, as well as a reinforcement for the radiator and frame.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a front view illustrating the application of the invention,

Figure 2 is a top plan view of the parts illustrated in Figure 1, and

Figure 3 is a detail view.

Corresponding and like parts are referred to in the following description and designated in the several views of the drawings by like reference characters.

It is to be understood that the brace may be applied to either the front or rear wheel fenders, although shown in the accompanying drawings in connection with the front fenders.

The brace comprises a coupler 1, connecting members 2 and a stay 3. The coupler 1 is in the nature of a rectangular frame and its opposite side members are apertured to receive the inner ends of the connecting members 2. The stay 3 approximates a truss brace and is riveted or otherwise secured intermediate its ends to the lower member of the frame 1. Opposite ends of the stay 3 engage the bolts 4, whereby the radiator is held to the frame.

The connecting members 2 consist of rods or bars having their inner portions threaded and provided at their outer ends with hooks 5 to engage over the outer edges of the fenders 6.

The inner threaded ends of the members 2 pass loosely through the openings formed in the side members of the coupler 1 and each receives a pair of nuts 7, whereby the brace may be adjusted as required. The coupler 1 is adapted to receive the number or license plate.

When the brace is applied to the front wheel fenders, it is located forwardly of the radiator with the connecting members 2 passing over the front fenders and engaging the outer edges thereof. The stay 3 materially strengthens the frame and the radiator, besides forming a support for the middle portion of the brace.

What is claimed is:

A fender brace comprising an open rectangular frame adapted to receive and support a license plate, the vertical sides of said frame having aligned openings, connecting members having hooks at their outer ends, said hooks adapted to engage over the outer edges of a pair of fenders, the inner ends of said connecting members being screw threaded and adapted to pass through the openings in the vertical sides of the frame, a pair of nuts upon the inner ends of each connecting member and adapted to adjustably connect the same to the frame, a stay of truss form attached intermediate its ends to the lower member of the frame, and said stay having its end portions outturned in opposite directions and perforated, whereby the same may be bolted to the chassis of the vehicle.

In testimony whereof I affix my signature. in presence of two witnesses.

GEORGE M. KENDALL.

Witnesses:
GEORGE A. McCALL,
C. A. FLEMING.